(12) United States Patent
Jang et al.

(10) Patent No.: US 9,647,507 B2
(45) Date of Patent: May 9, 2017

(54) MOTOR WITH ONE-WAY ROTATION

(71) Applicant: NEW MOTECH CO., LTD., Gwangju (KR)

(72) Inventors: Jeong Cheol Jang, Gwangju (KR); Gyeong Sik Yang, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 276 days.

(21) Appl. No.: 14/415,599

(22) PCT Filed: Aug. 26, 2013

(86) PCT No.: PCT/KR2013/007630
§ 371 (c)(1),
(2) Date: Jan. 18, 2015

(87) PCT Pub. No.: WO2014/038805
PCT Pub. Date: Mar. 13, 2014

(65) Prior Publication Data
US 2015/0180302 A1   Jun. 25, 2015

(30) Foreign Application Priority Data
Sep. 7, 2012 (KR) .................. 10-2012-0099254

(51) Int. Cl.
*H02K 5/16* (2006.01)
*H02K 7/108* (2006.01)
(Continued)

(52) U.S. Cl.
CPC ........... *H02K 5/163* (2013.01); *H02K 5/1732* (2013.01); *H02K 7/108* (2013.01); *H02K 7/1185* (2013.01); *H02K 21/22* (2013.01)

(58) Field of Classification Search
CPC ........ H02K 1/2786; H02K 5/16; H02K 5/163; H02K 7/108; H02K 7/1185; H02K 21/22
(Continued)

(56) References Cited

U.S. PATENT DOCUMENTS 7,703,307 B2 * 4/2010 Kim .................. D06F 37/36
68/133
7,732,961 B2 * 6/2010 Lin .................. H02K 1/146
310/153

(Continued)

FOREIGN PATENT DOCUMENTS

| KR | 10-0619783 B1 | 9/2006 |
| KR | 10-0686037 B1 | 2/2007 |
| KR | 10-0951425 B1 | 4/2010 |

OTHER PUBLICATIONS

International Search Report for PCT/KR2013/007630 mailed Oct. 28, 2013 from Korean Intellectual Property Office.

*Primary Examiner* — John K Kim
(74) *Attorney, Agent, or Firm* — Revolution IP, PLLC

(57) ABSTRACT

A motor with one-way rotation including: a stator having a stator core, an upper insulator joined to the upper portion of the stator core, and a lower insulator joined to the lower portion of the stator core; a rotor having a rotor housing which includes a disc part having a hollow portion formed at the center and a side wall part vertically formed along the outer circumference of the disc part in the upward direction, and a plurality of magnets attached to the inner face of the side wall part of the rotor housing, the disc part having a one-way bearing seating portion formed around the hollow portion; a rotary shaft penetrating through the central portions of the stator and the rotor; and a one-way bearing having an outer wheel joined to the one-way bearing seating portion and an inner wheel joined to the rotary shaft.

5 Claims, 3 Drawing Sheets

(51) Int. Cl.
*H02K 5/173* (2006.01)
*H02K 7/118* (2006.01)
*H02K 21/22* (2006.01)

(58) Field of Classification Search
USPC .............................. 310/75 C, 89, 90, 156.01
IPC ............................................... H02K 5/16,7/108
See application file for complete search history.

(56) References Cited

U.S. PATENT DOCUMENTS

| | | | |
|---|---|---|---|
| 8,348,798 B2* | 1/2013 | Lo | B60K 1/04 180/65.51 |
| 2007/0063595 A1* | 3/2007 | Habibi | H02K 1/2786 310/67 A |
| 2009/0174271 A1* | 7/2009 | Lin | H02K 1/146 310/153 |
| 2011/0037328 A1 | 2/2011 | Jang et al. | |
| 2012/0302390 A1* | 11/2012 | Lemire-Elmore | B60B 27/04 475/149 |
| 2015/0180302 A1* | 6/2015 | Jang | H02K 5/1732 310/90 |

* cited by examiner

MOTOR WITH ONE-WAY ROTATION

CROSS REFERENCE TO PRIOR APPLICATIONS

This application is a National Stage Application of PCT International Patent Application No. PCT/KR2013/007630 filed on Aug. 26, 2013, under 35 U.S.C. §371, which claims priority to Korean Patent Application No. 10-2012-0099254 filed on Sep. 7, 2012, which are all hereby incorporated by reference in their entirety.

TECHNICAL FIELD

The present invention relates to a motor, and more particularly, to a motor with a new and simple structure to rotate a rotary shaft of the motor unidirectionally.

BACKGROUND ART

In general, motors with a structure that a rotary shaft of the motor rotates just in one direction and is prevented from rotating in another direction, namely, in the reverse direction are needed in various fields. For instance, induction motors which are used in sporting goods, such as electronic bicycles or running machines, hybrid vehicles, and others need rotary shafts of the motors which are prevented from rotating in the reverse direction. Therefore, various forms of the motor structure for preventing the reverse rotation have been disclosed.

The representative structure for preventing the reverse rotation is a structure to stop rotation of the motor using a reverse rotation sensing circuit at the time that the rotary shaft rotates in the reverse direction. As a technology that does not use the reverse rotation sensing circuit, Korean Patent No. 10-0619783 discloses a hybrid induction motor with a reverse rotation prevention function. In Korean Patent No. 10-0619783, the hybrid induction motor includes a one-way bearing which has an outer wheel and an inner wheel, and only the inner wheel rotates at the time of one-way rotation but all of the inner wheel and the outer wheel rotate together at the time of reverse rotation. A rotary shaft of the motor is joined to the inner wheel of the one-way bearing and a pin is mounted to the outer wheel of the one-way bearing, such that when the outer wheel rotates at the time of the reverse rotation of the rotary shaft, the pin presses a power-down switch and the pin mounted on the outer wheel returns to its original position by elasticity of a returning spring, so as to prevent the reverse rotation of the rotary shaft of the motor.

According to the structure disclosed in Korean Patent No. 10-0619783, the induction motor has several problems in that it can prevent the reverse rotation of the rotary shaft of the motor but cannot prevent a minute reverse rotation that the pin mounted on the outer wheel of the one-way bearing moves to the power-down switch, and in that it is complicated in structure because it needs the power-down switch or the returning spring.

Therefore, in order to overcome the above-mentioned problems, the inventors of the present invention propose a motor with a new structure that can prevent the reverse rotation of the rotary shaft of the motor through a simple structure.

DISCLOSURE OF INVENTION

Technical Problem

Accordingly, the present invention has been made in an effort to solve the above-mentioned problems occurring in the prior arts, and it is an object of the present invention to provide a motor with a one-way rotation.

It is another object of the present invention to provide a motor which can prevent a reverse rotation of a rotary shaft of the motor through a simple structure It is a further object of the present invention to provide a motor which can reduce a manufacturing cost through the simple structure.

The above-mentioned objects and other objects and advantages of the present invention will be easily accomplished by the following description of the present invention.

Solution to Problem

To achieve the above objects, the present invention provides a motor with one-way rotation including: a stator having a stator core, an upper insulator joined to the upper portion of the stator core, and a lower insulator joined to the lower portion of the stator core; a rotor having a rotor housing which includes a disc part having a hollow portion formed at the center and a side wall part vertically formed along the outer circumference of the disc part in the upward direction, and a plurality of magnets attached to the inner face of the side wall part of the rotor housing, the disc part having a one-way bearing seating portion formed around the hollow portion; a rotary shaft penetrating through the central portions of the stator and the rotor; and a one-way bearing having an outer wheel joined to the one-way bearing seating portion and an inner wheel joined to the rotary shaft.

In the present invention, the upper insulator includes a stator bearing pressing part formed at the central portion thereof, and a stator bearing for rotatably supporting the rotary shaft is joined to the stator bearing pressing part.

Moreover, the motor further includes a rotor bearing joined below the portion where the one-way bearing of the rotary shaft is joined in order to support the rotation of the rotary shaft.

Furthermore, the stator bearing partly protrudes above the stator bearing pressing part, and the motor further includes an upper motor die having an opening to which the protruding portion of the stator bearing is joined.

Additionally, the motor further includes: a rotor bearing holder joined to the rotor bearing for supporting the rotor bearing; and a lower motor die to which the rotor bearing holder is joined.

Advantageous Effects of Invention

According to the present invention, the motor can prevent a reverse rotation of the rotary shaft of the motor through the simple structure, and reduce a manufacturing cost through the simple structure.

Reference will be now made in detail to the preferred embodiment of the present invention with reference to the attached drawings.

MODE FOR THE INVENTION

Figure 1:
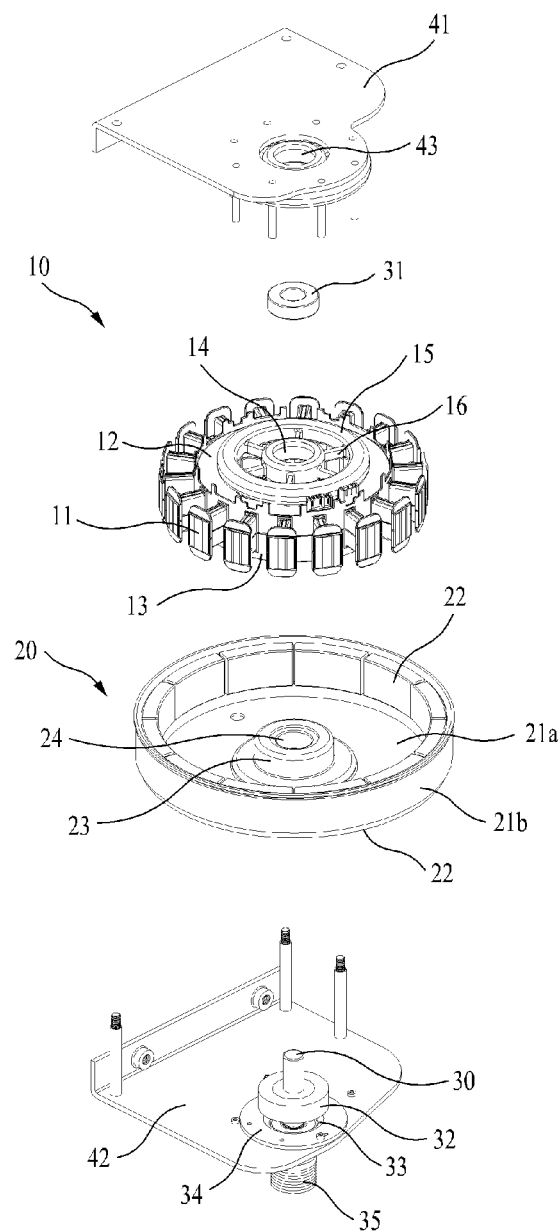
FIG. 1 is an exploded perspective view of a motor with one-way rotation according to the present invention.
Figure 2:
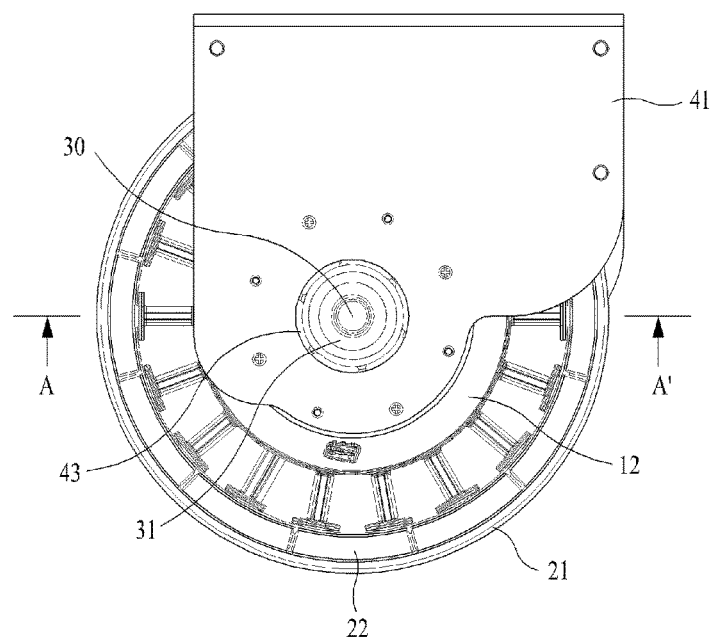
FIG. 2 is a plan view of the motor with one-way rotation according to the present invention.
Figure 3:
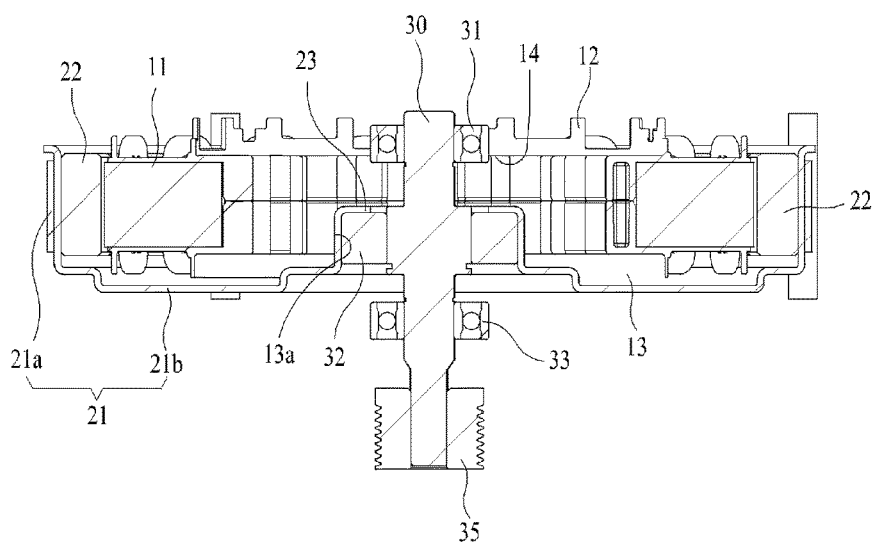
FIG. 3 is a sectional view taken along the line of A-A' of FIG. 2.

FIG. 1 is an exploded perspective view of a motor with one-way rotation according to the present invention, FIG. 2 is a plan view of the motor with one-way rotation according to the present invention, and FIG. 3 is a sectional view taken along the line of A-A' of FIG. 2. For your reference, in FIG. 3, for convenience sake, upper and lower motor dies 41 and 42 and a rotor bearing holder 34 are omitted.

Referring to FIGS. 1 to 3, the motor with one-way rotation according to the present invention includes a stator 10 and a rotor 20, and further includes an upper motor die 41 which surrounds the stator 10 and a lower motor die 42 which surrounds the rotor 20. For your reference, based on the exploded perspective view of FIG. 1, the upper side and the lower side in the present invention respectively mean the upper part and the lower part in the drawings.

The stator 10 is formed in such a manner that an upper insulator 12 and a lower insulator 13 are respectively joined to the upper part and the lower part of a stator core 11 which is manufactured by laminating thin metal sheets or by casting a metal melt. The stator 10 is completed in such a manner that a coil (not shown) is wound on teeth formed radially in the state where the upper insulator 12 and the lower insulator 13 are joined to the stator core 11 and the wound coil is connected electrically.

A stator bearing pressing part 14 is formed at the central portion of the upper insulator 12 and a stator bearing 31 for supporting the rotation of the rotary shaft 30 of the motor is joined to the stator bearing pressing part 14. That is, the stator bearing 31 supports a smooth rotation of the rotary shaft 30, and preferably, is joined to the stator bearing pressing part 14 in a forcedly pressed form. When the stator bearing 31 is pressed into the stator bearing pressing part 14, it is also good to press the stator bearing 31 in such a manner that the upper portion of the stator bearing 31 a bit protrudes from the stator bearing pressing part 14. In this instance, the protruding portion of the upper portion of the stator bearing 31 may be joined to an opening 43 of the upper motor die 41. Accordingly, the stator 10, the firmly joined state among the stator bearing 31 and the upper motor die 41 can be kept. In order to form the stator bearing pressing part 14 at the central portion of the upper insulator 12, a round rib 16 may be formed on the outer circumference of the stator bearing pressing part 14, and a support rib 16 for connecting the round rib 15 and the stator bearing pressing part 14 with each other may be also formed. Preferably, the round rib 15 protrudes above the upper insulator 12. A plurality of support ribs 16 may be formed. FIG. 1 illustrates six support ribs, but the number of the support ribs 16 is not restricted to six, the number of the support ribs can be applied suitably according to needs or the support ribs may be omitted when the stator bearing pressing part 14 and the round rib 15 are formed in direct contact with each other.

The rotor 20 is formed in a cup shape that includes a flat disc part 21a having a hollow portion 24 formed at the central portion thereof and a side wall part 21b vertically formed on the outer circumference thereof. A plurality of magnets 22 are attached to the inner face of the side wall part 21b. The rotary shaft 30 penetrates through the hollow portion 24 formed at the center of the disc part 21a. A one-way bearing seating portion 23 is formed around the hollow portion 24 so as to join the one-way bearing 32 to the rotor 20. The one-way bearing seating portion 23 protrudes in the inward direction of a rotor housing 21, and the one-way bearing 32 is joined to the outer face of the rotor housing 21. In consideration of easiness in working or reduction of the manufacturing cost, it is preferable that the one-way bearing 32 is forcedly pressed and joined into the one-way bearing seating portion 23. In FIGS. 1 and 3, the one-way bearing seating portion 23 protrudes to the inside of the rotor housing 21 and the one-way bearing 32 is joined to the outer face of the rotor housing 21, but the present invention is not restricted to the above form. In other words, the one-way bearing seating portion 23 may protrude to the outside of the rotor housing 21 and the one-way bearing 32 may be joined to the inside of the rotor housing 21.

Referring to FIG. 3, the lower insulator 13 has a space portion 13a in which the one-way bearing seating portion 23 is inserted and rotated. When the rotor 20 rotates, the one-way bearing seating portion 23 is also rotated, and the one-way bearing seating portion 23 is located and rotated inside the space portion 13a. Therefore, the one-way bearing seating portion 23 and the space portion 13a are not in contact with each other and a predetermined space is formed between the one-way bearing seating portion 23 and the space portion 13a so as to allow the rotation of the rotor 20.

Referring to FIGS. 1 and 3, the rotary shaft 30 of the present invention penetrates through the central portions of the stator 10 and the rotor 20. As described above, the upper portion of the rotary shaft 30 is rotatably supported by the stator bearing 31 joined to the stator bearing pressing part 14 formed at the upper portion of the central portion of the upper insulator 12. Moreover, the inner wheel of the one-way bearing 32 is joined to the lower portion on which the stator bearing 31 of the rotary shaft 30 is supported. The outer wheel of the one-way bearing 31 is joined to the one-way bearing seating portion 23 formed at the center of the rotor housing 21. The one-way bearing 32 has the inner wheel and the outer wheel, and when power supply is applied to the motor, the rotor housing 21 is rotated and the outer wheel is also rotated. When the outer wheel rotates in the forward direction, the inner wheel is also rotated, but when the outer wheel is rotated in the reverse direction, the inner wheel is not rotated. Therefore, even though the rotor housing 21 rotates in the reverse direction, the rotary shaft 30 does not rotate in the reverse direction. Accordingly, also a load 35 joined to an end of the rotary shaft 30 also rotates just in one direction (forward direction) and does not rotate in the reverse direction.

A rotor bearing 33 for rotatably supporting the rotary shaft 30 is mounted at the lower portion of the one-way bearing 32 of the rotary shaft 30. The rotor bearing 33 is joined to a rotor bearing holder 34, and the rotor bearing holder 34 is joined to the lower motor die 42. The load 35 is joined to the lower end of the rotary shaft 30, and may adopt various kinds and forms according to the use purpose of the motor. In FIG. 1, a pulley type load 35 is illustrated, but the form of the load 35 is not restricted to the type and various kinds of the load, such as a fan, a wheel, a chain, a gear or others may be adopted as the load 35.

The upper motor die 41 and the lower motor die 42 serve to surround the outer face of the motor including the stator 10 and the rotor 20. According to circumstances, they are not in the die form but in a housing form or a casing form. In this instance, the opening 43 of the upper motor die 41 to which the stator bearing 31 is forcedly pressed is applied to the housing or the casing in the same way. Furthermore, the rotor bearing holder 34 is also joined to the housing or the casing.

Figure 4:
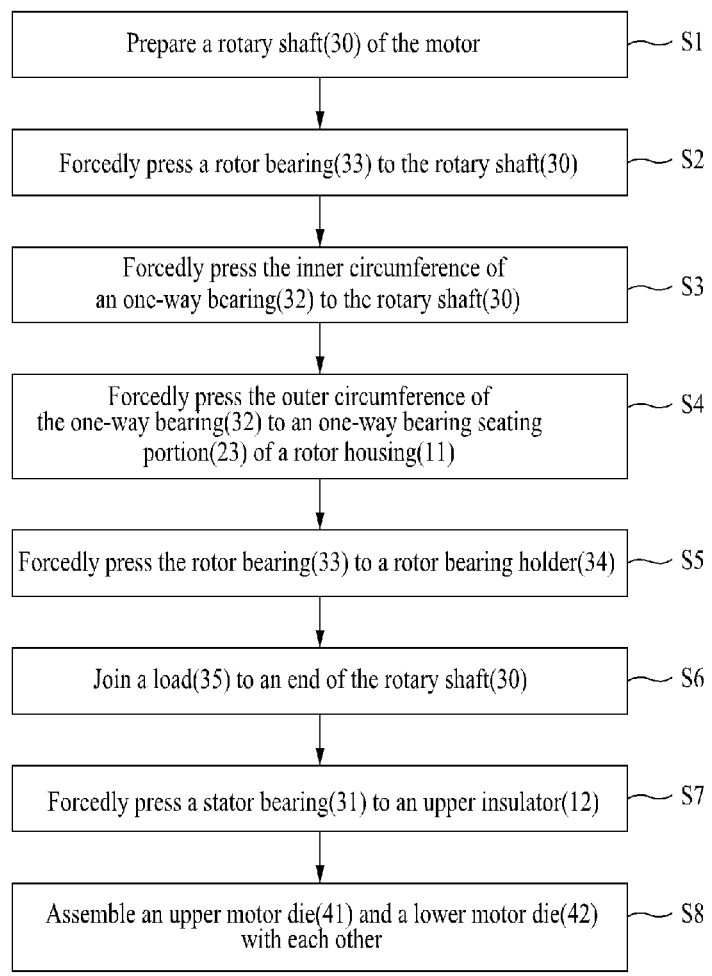
FIG. 4 is a flow chart showing a manufacturing process of the motor with one-way rotation according to the present invention.

FIG. 4 is a flow chart showing a manufacturing process of the motor with one-way rotation according to the present invention.

The manufacturing process of the motor with the one-way rotation illustrated in FIG. 4 is achieved based on the form of the motor illustrated in FIG. 1. The order of the manufacturing process may be changed according to the form of the one-way bearing seating portion 23 of the rotor housing 21.

Referring to FIG. 4, first, the rotary shaft 30 of the motor is prepared (Step S1). The rotor bearing is forcedly pressed and joined to the lower portion of the rotary shaft (Step S2), and then, the inner circumferential portion of the one-way bearing 32 is joined to the rotary shaft 30 from the upper portion of the rotary shaft 30 (Step S3).

Next, the outer wheel of the one-way bearing 32 is joined to the one-way bearing seating portion 23 of the rotor housing 21 by forced pressure fitting (Step S4). Next, the rotor bearing holder 34 is joined to the outer circumference of the rotor bearing 33 joined to the lower portion of the rotary shaft 30 by forced pressure fitting (Step S5). The pulley-like load 35 is joined to the lower end of the rotary shaft (Step S6), and then, stator 10 is located inside the rotor housing 21 and the stator bearing 31 is pressed into the stator bearing pressing part 14 formed in the upper insulator 12, and then, the rotary shaft 30 is joined to the stator 10 (Step S7). After that, when the upper and lower motor dies 41 and 42 are assembled (Step S8), the motor according to the present invention is completed.

As described above, while the present invention has been described with reference to the particular illustrative embodiments, it will be understood by those skilled in the art that the present invention is not to be restricted by the embodiments but is defined only by the appended claims. It will be understood by those skilled in the art that various modifications, changes and equivalents belong to the present invention without departing from the scope and spirit of the present invention.

The invention claimed is:

1. A motor with one-way rotation comprising:
   a stator having a stator core, an upper insulator joined to the upper portion of the stator core, and a lower insulator joined to the lower portion of the stator core;
   a rotor having a rotor housing which includes a disc part having a hollow portion formed at the center and a side wall part vertically formed along the outer circumference of the disc part in the upward direction, and a plurality of magnets attached to the inner face of the side wall part of the rotor housing, the disc part having a one-way bearing seating portion formed around the hollow portion;
   a rotary shaft penetrating through the central portions of the stator and the rotor; and
   a one-way bearing having an outer wheel joined to the one-way bearing seating portion and an inner wheel joined to the rotary shaft, wherein
   the upper insulator includes a stator bearing pressing part formed at the central portion thereof, and a stator bearing for rotatably supporting the rotary shaft is joined to the stator bearing pressing part.

2. The motor according to claim 1, further comprising:
   a rotor bearing joined below the portion where the one-way bearing of the rotary shaft is joined in order to support the rotation of the rotary shaft.

3. The motor according to claim 1, wherein the stator bearing partly protrudes above the stator bearing pressing part, and
   further comprising:
   an upper motor die having an opening to which the protruding portion of the stator bearing is joined.

4. The motor according to claim 3, further comprising:
   a rotor bearing holder joined to the rotor bearing for supporting the rotor bearing; and
   a lower motor die to which the rotor bearing holder is joined.

5. The motor according to claim 1, further comprising:
   a rotor bearing joined below the portion where the one-way bearing of the rotary shaft is joined in order to support the rotation of the rotary shaft.

* * * * *